United States Patent
Lomet et al.

(10) Patent No.: US 7,047,441 B1
(45) Date of Patent: May 16, 2006

(54) RECOVERY GUARANTEES FOR GENERAL MULTI-TIER APPLICATIONS

(75) Inventors: David B. Lomet, Redmond, WA (US); Roger Barga, Newcastle, WA (US); Gerhard Weikum, Saarbruecken (DE)

(73) Assignee: Microsoft Corporation, Redmond, WA (US)

(*) Notice: Subject to any disclaimer, the term of this patent is extended or adjusted under 35 U.S.C. 154(b) by 655 days.

(21) Appl. No.: 09/946,050

(22) Filed: Sep. 4, 2001

(51) Int. Cl.
*G06F 11/00* (2006.01)

(52) U.S. Cl. .............................. 714/13; 714/15; 714/16; 719/313; 719/318

(58) Field of Classification Search .................. 714/13, 714/16, 17, 18, 15; 719/313, 318, 314
See application file for complete search history.

(56) References Cited

U.S. PATENT DOCUMENTS

| | | | | |
|---|---|---|---|---|
| 5,640,561 A | * | 6/1997 | Satoh et al. | 707/202 |
| 5,850,508 A | * | 12/1998 | Lee et al. | 714/20 |
| 5,875,291 A | * | 2/1999 | Fox | 714/15 |
| 6,351,754 B1 | * | 2/2002 | Bridge et al. | 707/202 |
| 6,490,610 B1 | * | 12/2002 | Rizvi et al. | 718/101 |
| 6,529,932 B1 | * | 3/2003 | Dadiomov et al. | 718/101 |
| 6,654,907 B1 | * | 11/2003 | Stanfill et al. | 714/16 |
| 6,721,766 B1 | * | 4/2004 | Gill et al. | 707/204 |
| 2001/0042224 A1 | * | 11/2001 | Stanfill et al. | 714/16 |
| 2003/0140272 A1 | * | 7/2003 | Lawrance et al. | 714/13 |
| 2003/0212690 A1 | * | 11/2003 | Surma et al. | 707/100 |

OTHER PUBLICATIONS

Barga, R. et al., "Persistent Client–Server Database Sessions," $7^{th}$ Int'l. Conf. on Extending Database Technology, 2000, Redmond, WA, 15 pages.
Bernstein, P. et al., "Implementing Recoverable Requests Using Queues," *ACM SIGMOD*, 1990, Cambridge, MA, 112–122.
Lomet, D., "Persistent Applications Using Generalized Redo Recovery," *IEEE Int'l. Conference on Data Engineering*, 1998, Redmond, WA, 10 pages.
Lomet, D. et al., "Efficient Transparent Application Recovery in Client–Server Information Systems," *ACM SIGMOD Conf. on Management of Data*, 1998, 12 pages.
Lomet, D. et al., "Logical Logging to Extend Recovery to New Domains," *ACM SIGMOD Conf. on Management of Data*, 1999, Philadelphia, PA, 12 pages.

* cited by examiner

*Primary Examiner*—Robert Beausoliel
*Assistant Examiner*—Yolanda Wilson
(74) *Attorney, Agent, or Firm*—Woodstock Washburn LLP (57) ABSTRACT

A technique is described for guaranteeing recovery in a computer system comprising of recovery contracts with a plurality of obligations for a message exchange between a first component and a second component. Three forms of contract are described, governing interactions between three types of components. Each contract is bilateral, i.e. between a first component and a second component. The first and second components have mutual agreement on when the contract will be released to facilitate log truncation, and independent and/or autonomous recovery.

3 Claims, 6 Drawing Sheets

RECOVERY GUARANTEES FOR GENERAL MULTI-TIER APPLICATIONS

FIELD OF THE INVENTION

The present invention relates generally to the field of computer systems and applications that execute on them and, more particularly, to masking system failures from applications and users.

BACKGROUND OF THE INVENTION

Database recovery alone is insufficient for masking failures to applications and users. Transaction atomicity merely guarantees all-or-nothing but not exactly-once execution of user requests. Therefore, application programs need to have explicit code for retrying failed transactions. Often such code is incomplete or missing, and then failures are exposed to the user. Or even worse, a failure occurs with no notice provided, which can occur if the system executing the application crashes. For an e-commerce service, such behavior is embarrassing, and also inconvenient to the user. On the other hand, the application program or the user must not blindly re-initiate a request even if no positive return code has been received, as the request may nevertheless have succeeded. For this reason, some e-services warn users to be careful about not hitting the checkout/buy/commit button twice even if there appears to be a long service outage from the user's viewpoint.

Fault-tolerance for systems of communicating processes has been studied. However, the primary focus has been on long-running computations (e.g., in scientific applications) with distributed checkpointing to avoid losing too much work by failures. With respect to the state exposure that is inherent in message exchanges with human users, these aspects are addressed by "pessimistic logging" which involves forced log I/Os for both sender and receiver upon every message exchange. Similar, and sometimes even more expensive techniques such as process checkpointing (i.e., state installation onto disk) upon every interaction, have been used in the pioneering industrial projects on fault-tolerant business servers in the early 1980s. The current "fail-safe" solutions are limited in that either they require explicit application code for failure handling, require stateless components, or they are incapable of handling failures at all levels of a general multi-tier application.

In view of the foregoing, there is a need for systems and methods that overcome the limitations and drawbacks of the prior art.

SUMMARY OF THE INVENTION

The present invention describes a general framework for recovery guarantees in modern settings so that virtually all failures can be masked, and applications can be made persistent. This is done without the application itself having to deal with persistence. An interaction contract between two components is generated. These contracts are pledges with respect to message and state recreatability, message uniqueness and agreement on when the contract will be released to facilitate log truncation. Bilateral contracts of this form can be composed into system-wide agreements, such that the entire system is provably recoverable and guarantees exactly-once message delivery and execution, with the possible exception of crashes that occur during user input or output. Aspects of the invention include implementation techniques that aim to minimize the cost of logging, allow effective log truncation, and include provisions for independent recovery of critical server components.

Other features of the invention are described below.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION OF PREFERRED EMBODIMENTS

Overview

The present invention is directed to recovery guarantees in general multi-tier applications, to mask failures of clients, application servers, or data servers. A piecewise deterministic component is used in the specific settings of multi-tier applications (e.g., Web-based). By logging its non-deterministic events, it is ensured that, after a failure, a component can be locally replayed from an earlier installed state and arrive at exactly the same state as in the component's previous incarnation before the failure. Failures are assumed to be (i) soft, i.e., no damage to stable storage so that logged records are available after a failure; and (ii) fail-stop so that only correct information is logged and erroneous output does not reach users or persistent databases.

A committed interaction contract (CIC) comprises the following obligations for each message exchange: the sender promises the recreatability of the message and its state as of interaction time and uniqueness of the message, the receiver promises to detect and suppress duplicates, and there is a mutual agreement on when the contract will be released to facilitate log truncation. Contracts for interactions with external users and for transactional components are also provided. The bilateral contracts can be composed into system-wide agreements such that the entire system is recoverable with exactly-once execution semantics.

Implementation techniques are provided that: minimize the cost of logging, especially the need for forcing the log to disk; allow effective log truncation to bound the amount of work during restart and thus provide high availability; and include provisions for independent recovery of critical server components.

Computing Environment

Figure 1:
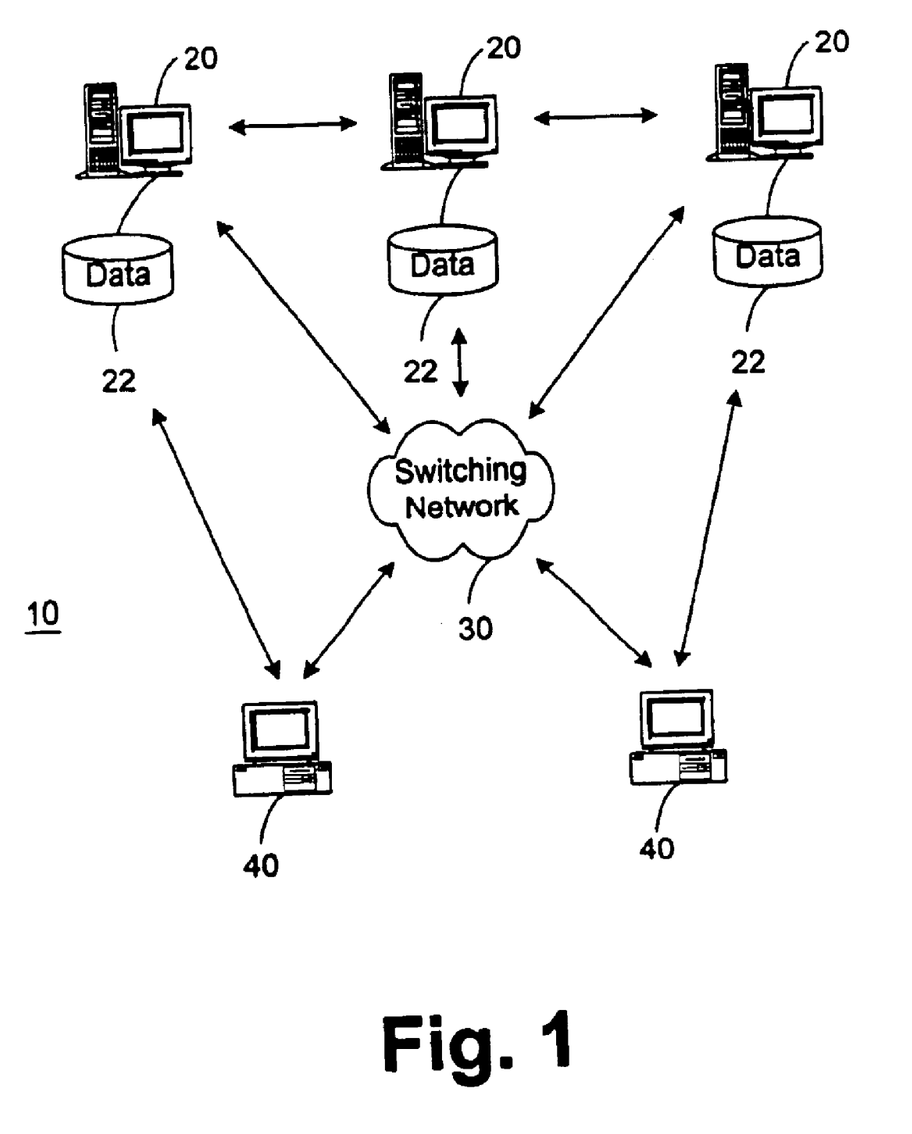
FIG. 1 illustrates a high level example of a distributed computing environment in which the invention may be implemented.

FIG. 1 illustrates a high level example of a distributed computing environment 10 in which the invention may be implemented. A plurality of servers 20, each having memory 22, are interconnected, either directly or through an optional switching network 30. A plurality of clients 40 are connected to the servers 20, either directly or through the optional switching network 30. Each of the clients 40 and servers 20 are described in further detail below.

Figure 2:
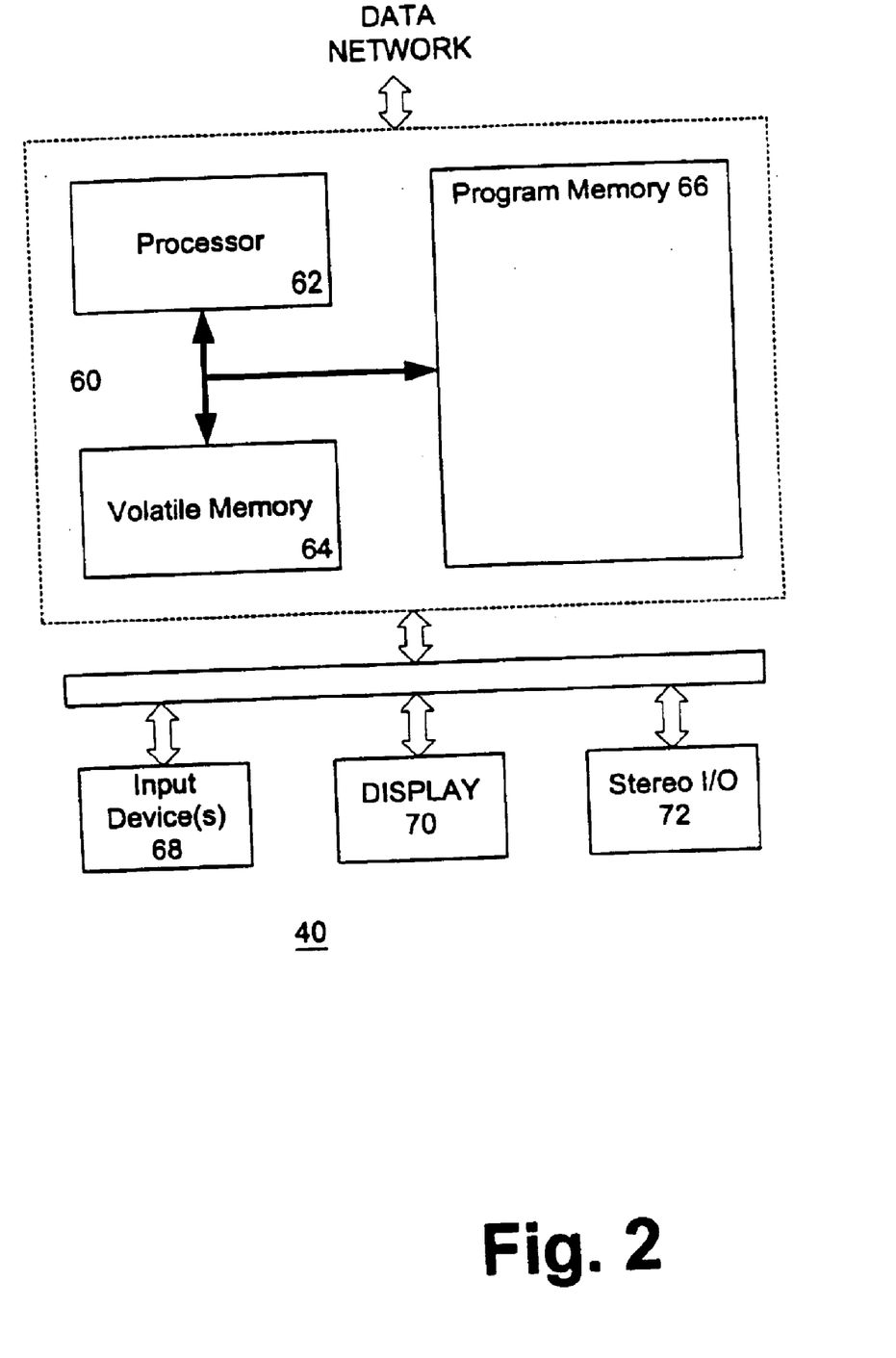
FIG. 2 shows an exemplary configuration of a client implemented as a computer.

FIG. 2 shows an exemplary configuration of a client 40 implemented as a computer. It includes a central processing unit 60 having a processor 62, volatile memory 64 (e.g., random access memory (RAM)), and program memory 66 (e.g., read only memory (ROM), flash, disk drive, floppy disk drive, CD-ROM, and the like). The client 40 has one or more input devices 68 (e.g., keyboard, mouse, etc.), a computer display 70 (e.g., VGA, SVGA), and a stereo I/O 72 for interfacing with a stereo system.

The client 40 runs an operating system that supports multiple applications. The operating system is preferably a multitasking operating system that allows simultaneous execution of multiple applications. The operating system employs a graphical user interface windowing environment that presents the applications or documents in specially delineated areas of the display screen called "windows." One preferred operating system is a Windows® brand operating system sold by Microsoft Corporation, such as Windows® 95 or Windows® NT or other derivative versions of Windows®. It is noted, however, that other operating systems that provide windowing environments may be employed, such as the Macintosh operating system from Apple Computer, Inc. and the OS/2 operating system from IBM.

Figure 3:
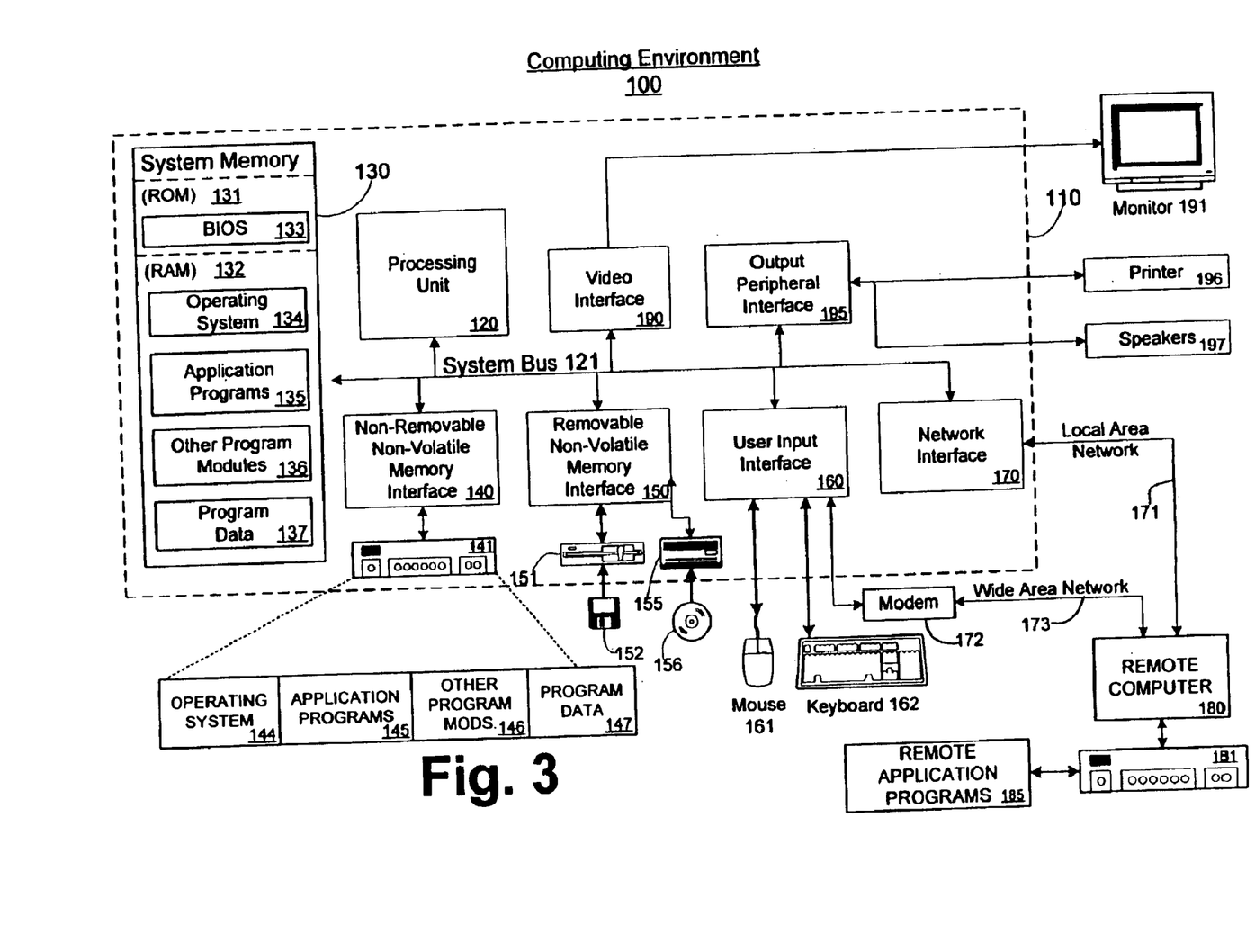
FIG. 3 is a block diagram showing an exemplary computing environment in which aspects of the invention may be implemented.

FIG. 3 illustrates a more detailed example of a suitable computing system environment 100 in which the invention may be implemented. Each server and client can incorporate the environment 100 of FIG. 3. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network or other data transmission medium. In a distributed computing environment, program modules and other data may be located in both local and remote computer storage media including memory storage devices.

With reference to FIG. 3, an exemplary system for implementing the invention includes a general purpose computing device in the form of a computer 110. Components of computer 110 may include, but are not limited to, a processing unit 120, a system memory 130, and a system bus 121 that couples various system components, including the system memory, to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media include both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as ROM 131 and RAM 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 3 illustrates operating system 134, application programs 135, other program modules 136, and program data 137.

The computer 110 may also include other removable/non-removable, volatile/nonvolatile computer storage media. By way of example only, FIG. 3 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 3, provide storage of computer readable instructions, data structures, program modules and other data for the computer 110. In FIG. 3, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 3. The logical connections depicted in FIG. 2 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 3 illustrates remote application programs 185 as residing on memory device 181. It will be appreciated that the network connections shown are exemplary and other means of establishing a communications link between the computers may be used.

Recovery Contracts Between Components

Contracts among persistent components and between persistent components and external components are now described. Component guarantees refer to the behavior of individual components, and are the basis for interaction contracts between components. Each component may provide guarantees with regard to persistence of state and/or messages.

Persistent state means that the component guarantees that its state will be available (e.g., via reconstruction) as of some specific time, such as when a message is sent. Persistent messages means that the component guarantees that the contents of its sent messages will be available (e.g., via reconstruction) either by periodic resend or upon request from another component.

Components (e.g., clients, application servers, data servers, etc.), that may be mapped to processes or threads for example, are piecewise deterministic (PWD). To be PWD, a computation by the component is strictly deterministic between two successive non-deterministic events, e.g. messages received from other components, so that the component can be replayed from an earlier state if the original messages are fed again into the replayed component. Such deterministic replay is guaranteed to send the same messages to other components as were sent in the component's original execution, and to produce the same component end state. The replay starts from some previous component state read from memory, one extreme being the component's initial state. Server state may include persistent data (e.g., a database), messages, and session information, though this is not always the case (e.g., a compact abstract state may be used).

A client that synchronously communicates with one or more servers, suspending its execution after a message send and awaiting a reply message from a uniquely identified server, is easily seen to be PWD. In contrast, for an application server running multiple concurrent threads on behalf of different clients and communicating in an asynchronous manner, the PWD assumption is not guaranteed without some effort. For such components there are three types of non-determinism:

(1) A component may execute on multiple, concurrent threads that access shared data such that capturing the access interleaving order is desirable for successful replay. Examples include database servers and application servers that cache data and share it among multiple threads. It is assumed that there is no shared state between different components. If multiple components access common data, that data is desirably in a component, e.g., multiple components communicating with a database server. Data access non-determinism is removed by the component logging the interleaved accesses to the data.

(2) A component's execution may depend on asynchronous events such as asynchronously received messages (i.e., messages prompting component execution at arbitrary points), reading the clock, or reacting to interrupts from external sensors. These events are not reproducible during replay of the component. Just as with concurrent threads accessing shared data, the order (and perhaps timing) of asynchronous events is preferably recorded on the log to guarantee deterministic component replay. Often logical logging, with short log entries, is sufficient for this purpose. For example, it is sufficient to log that a thread read some data element from, e.g., a persistent database or a shared file, after another thread wrote the element, provided that the value read can be recovered from the database. Likewise, one need not log the contents of a message but merely its arrival and its message ID if message contents can be recreated by other means (e.g., by the message sender). However, there are cases when physical logging is inevitable, e.g., when reading the real-time clock.

(3) Replay of a component does not necessarily reproduce exactly the same IDs for system elements as the original execution, and this also is a form of non-determinism. IDs for messages sent before a failure may differ from the IDs of re-played messages when message IDs refer to session numbers; IDs for processes, threads, or users may also change. To cope with non-determinism resulting from system resource mapping, these underlying resources are virtualized by introducing logical IDs for messages, component instances, etc. These logical IDs can be mapped to different physical entities after a crash, but at the abstract or logical level, the logically identified component becomes PWD. These mappings are logged.

Implementing guarantees desirably uses a log and a recovery manager as part of the run-time environment. During normal operation, log entries are created in a log buffer for received messages, sent messages, and other non-deterministic events, and the log buffer is written to a stable log on disk at appropriate points or when it is full. In addition, the entire component state may be periodically installed or saved to disk in an installation point (application state checkpoint). Installation points facilitate log truncation, frequently making log records preceding the installation point unnecessary. For a data server that uses a stable log for the recoverability of its persistent data, this same log can be used to hold the message-related and other log entries. Preferably, the logs capture the order of all non-deterministic events.

Figure 4:
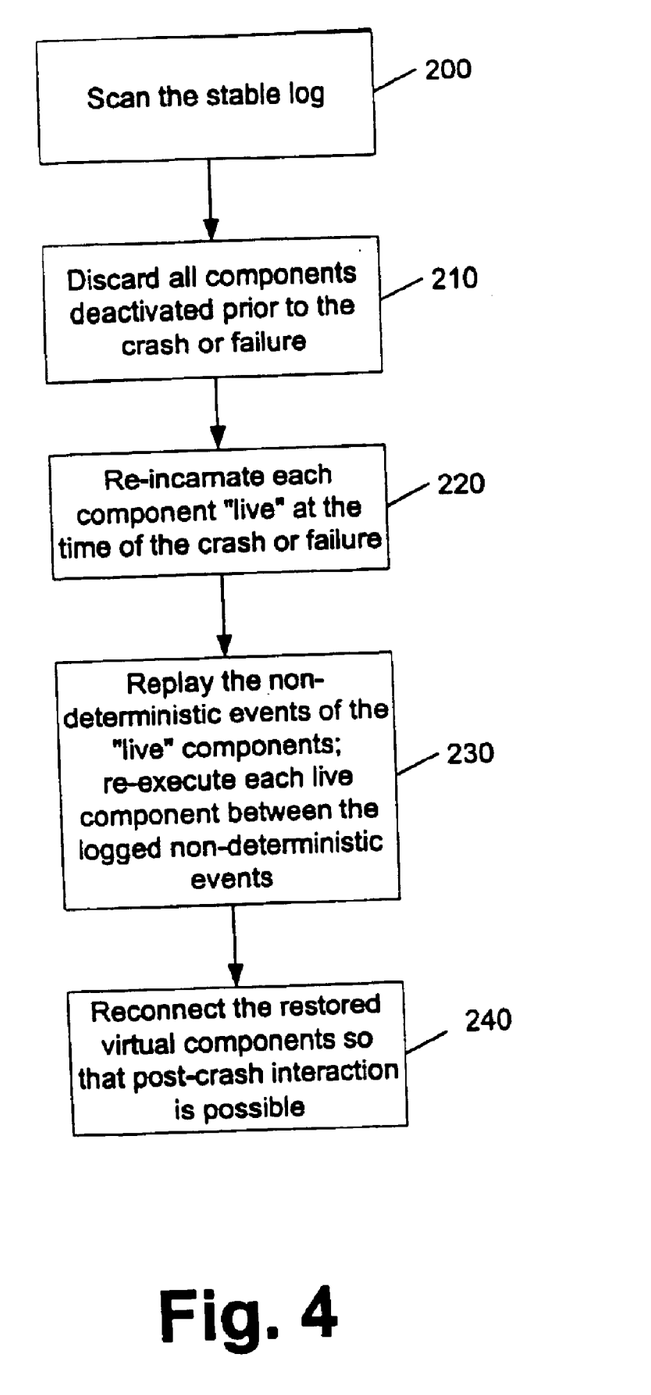
FIG. 4 shows a flow chart of an exemplary method of recovery in accordance with the present invention.

FIG. 4 shows a flow chart of an exemplary method of recovery in accordance with the present invention, after a failure has been detected. During restart after a failure, the recovery system scans the relevant parts of the stable log, at step 200, to retrieve information relevant to the recovery and the components involved. Then, at step 210, the components that were deactivated prior to the failure are determined and discarded, based on the retrieved information. At step 220, each component that was "live" at the time of the failure is re-incarnated. At step 230, each live component is re-executed, with the non-deterministic events of the live components replayed from the log. At step 240, the restored virtual components are reconnected so that post-failure interaction is possible.

When log entries are "logical" (as opposed to physical) and do not contain message contents, the reconstruction of input messages may use communication to obtain the message contents from the sender. For this, a recovery contract can exist with the sender to ensure that the message can be provided again. Outgoing messages for which the replaying component knows the recipient has successfully and stably received prior to a failure may be suppressed. However, if the component cannot determine this, then the message is re-sent, and it is up to the receiver to test for duplicates.

A component can guarantee a) persistent state as of the time of the last sent message or more recent and b) persistent sent messages from the last installation point up to and including the last sent message if it (1) logs all non-deterministic events, such that these events can be replayed, (2) forces the log upon each message send (before actually sending it) if there are non-deterministic events that are not yet on the stable log, and (3) can recreate, possibly with the help of other components, the contents of all messages it received since its last installation point.

By ensuring that all prior non-deterministic events are stable on the log upon each message send, the component can be replayed at least up to and including the point of its last send. This is because the last installation point can be reconstructed from the log and received messages can be accessed, perhaps locally, perhaps by request to their senders. The latter implies that the component has not necessarily logged the contents of its received messages. Preferably, all outgoing messages can be recreated during the component replay. This does not require that the message send is itself logged; rather, outgoing messages can be deterministically reconstructed provided all preceding non-deterministic events are on the log or already installed in the component state.

An interaction contract specifies the joint behavior of two interacting components. In an interaction contract, each of the two components makes certain guarantees, depending on the nature of the contract.

Committed interaction contract (CIC) recovery contracts between two persistent components provide a mutual committed state transition, both agree upon this move, and both guarantee that the state transition is persistent. This guarantee is permanent, but the log records needed to provide the guarantee can be discarded when both components agree that they are no longer needed. Such agreements can be set up, for example, by limiting the logging to the last state transition common to the two involved components, or dynamically negotiated.

Three types of components are considered as contract partners: persistent components (Pcom's) whose state should persist across failures, transactional components (Tcom's), such as databases, which provide all-or-nothing state transitions (but not exactly-once executions), and external components (Xcom's) to capture human users who usually cannot provide any recovery guarantees, or components external to the recovery framework.

A committed state transition involves components that are intended to persist across system failures. One persistent component sends a message and the other persistent component receives it. A CIC is used for making applications persistent and masking failures to users.

A CIC comprises the following obligations: Sender Obligation 1 (S1): Persistent Sender State—The sender promises that its state as of the time of the message or a more recent state is persistent. Sender Obligation 2 (S2): Persistent Message. S2a: The sender promises to send the message periodically, driven by timeouts, until the receiver releases it (perhaps implicitly) from this obligation. S2b: The sender promises to resend the message upon explicit request of the receiver until the receiver releases it from this obligation. This is distinct from S2a and the release is usually more explicit. Sender Obligation 3 (S3): Unique Message—The sender promises that each message that it sends will be unique, so that it is possible for the receiver to distinguish resends of messages from sends of messages that happen to have the same content. These sender obligations ensure that the interaction is recoverable, i.e. it is guaranteed to occur, though not with the receiver guaranteed to be in exactly the same state.

Receiver obligations include: Receiver Obligation 1 (R1): Message Duplication Elimination—The receiver promises to detect and eliminate duplicate messages (which the sender enables via S3 and may send to satisfy S2a). Receiver Obligation 2 (R2): Persistent Receiver State—The receiver promises that before releasing sender obligation S2a, its state as of the time of the message receive or later is persistent without the sender periodically re-sending. After this S2a release, a receiver explicitly requests the message from the sender should it be needed and the interaction is stable, i.e., it persists (via recovery if needed) with the same state transition as the original execution. The receiver promises that before releasing the sender from obligation S2b, its state as of the time of the message receive or later is persistent without the need to request the message from the sender. After this S2b release, the interaction is installed, i.e., replay of the interaction is no longer needed.

The sender makes an immediate promise whereas the receiver merely promises to follow certain rules for releasing the contract. By sending a message, the sender exposes its current state and commits itself to that state and the resulting message. The sender does not know the implications on either other components or external users that could result from subsequent execution of the receiver. Therefore, the sender must be prepared to re-send the identical message if needed by some later recovery action and also to recreate the same state during replay after a failure.

Each contract pertains to one message. However, to fully discharge the contract may use several messages. Releasing the contract eventually is desirable so that the sender is freed from its obligations. Once the CIC is released, the sender can discard all information on the interaction; however, the sender still guarantees the persistence of its own state at least as recent as of that interaction. This persistent state guarantee is provided in accordance with the present invention.

Figure 5:
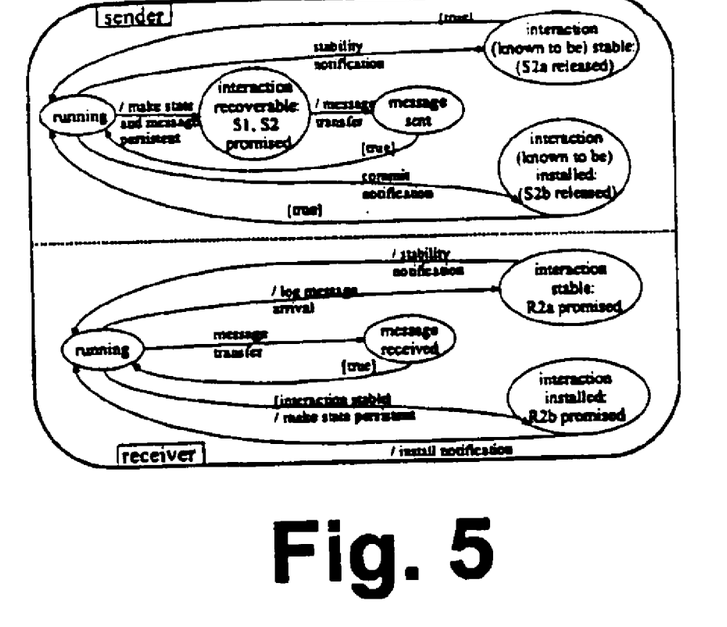
FIG. 5 is a statechart for a committed interaction contract in accordance with the present invention.

The behavior of sender and receiver under a committed interaction contract is depicted as a statechart in FIG. 5. The ovals show sender states and receiver states. Transitions are labeled with "event [condition]/action" rules where each component of the triple is optional and omitted when not needed. A transition fires if the specified event occurs and its condition is true, and the state transition then executes the specified action. For example, the label "/stability notification" of the receiver's transition from "interaction stable" state into "running" state specifies that this transition fires unconditionally (i.e., its condition is "[true]") and its action is sending a stability notification. For the sender, the transition labeled "stability notification" makes the corresponding state change when it (asynchronously) receives the stability notification (i.e., when the event "stability notification" is raised). Both sender and receiver return to their running state before making further steps towards a stable interaction. The CIC allows the intermediate states for the two components to exist over an extended period, enabling logging optimizations. [Note that, for brevity, all transitions for periodic resends have been omitted (e.g., the sender's periodic re-send of the actual message until it receives the stability notification).]

In some applications, it is desirable to release the sender from its obligations all at once. This can be useful not only to the sender, but also to the receiver, as it enables the receiver to recover independently of the sender. This is achieved by strengthening the interaction contract into an immediately committed interaction contract (ICIC) as follows.

An immediately committed interaction is a committed interaction where the sender is released from both message persistence requirements, S2a and S2b, when the receiver notifies the sender (usually via another message) that the message-received state has been installed, without previously notifying the sender that its state is stable. The receiver's announcement thus makes the interaction both stable and installed simultaneously.

Figure 6:
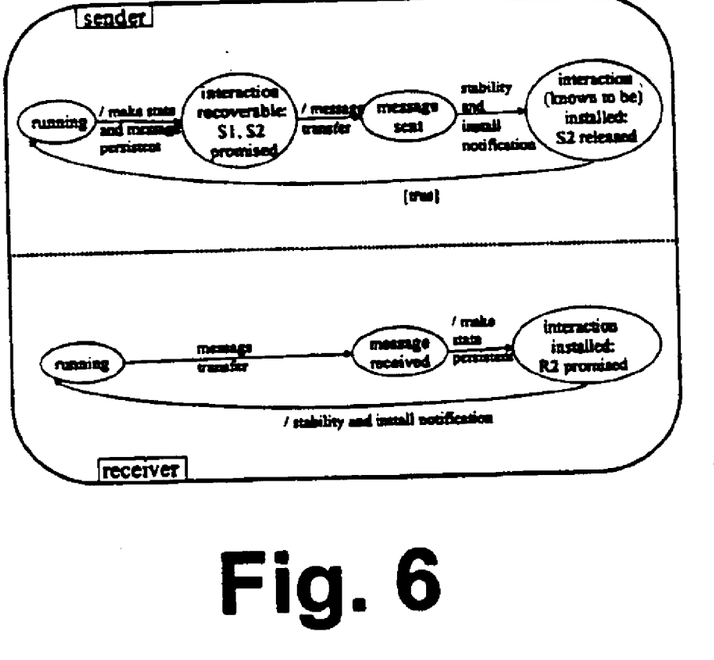
FIG. 6 is a statechart for an immediately committed interaction contract in accordance with the present invention.

An ICIC can be considered as a package of two CICs, the first one for the original message and the second one for a combined stability-and-install notification sent by the receiver component. In contrast to a CIC, the sender waits synchronously for this notification (rather than resuming other work in its "running" state), and the receiver's part of the committed interaction is no longer deferrable. The sender guarantees that it will re-send the message until it eventually gets the receiver to commit the interaction. FIG. 6 depicts the ICIC behavior as a statechart.

With a CIC, whether either party desires logging depends on whether there are non-deterministic events that need to be made repeatable. If not, then no logging is used, as the interaction is made persistent via replay, including the message contents. With an ICIC, the receiver makes stable the message contents so that its state, which includes the receipt of the message, is persistent without contacting the sender.

Application to Client-Server Interactions

The applicability of CICs in a client-server setting is now described. Consider a client and a data-server that communicate in an arbitrarily long sequence of request-reply interactions, where each request is independent of the prior server state. If each request is under an ICIC, and each reply is under a CIC, then failures can be masked and the entire interaction sequence provided with exactly-once semantics without client forced logging, and without the server depending upon the client for its recovery.

The client is piecewise deterministic (PWD) in that it does not exhibit any non-deterministic events (interaction with a human user is via separately logged XICs as described below). By the CIC, both client and server states and all messages are persistent until the contracts are released. The server releases the client by means of the reply message. Until the reply is received, the client repeatedly sends the request. Prior interaction contracts, in combination with the client's PWD property, permit the client to have this as recreatable behavior purely via deterministic replay, asking the server for missing reply messages. The client does not release the server from its contract until it is itself able to recreate the replies or no longer needs them for replay. This may require eventually logging the reply, or installing a later client state. The server releases the client from its need to periodically re-send the request simultaneously with its reply. Hence, the request becomes installed at this point.

Interactions Involving Other Components

Regarding external interactions, one form of external component (Xcom) is a human user. An external interaction contract (XIC) provides an immediately committed interaction with external components, including users. An XIC is a contract in which the internal component subscribes to the rules for an immediately committed interaction, while the external component does not. The impact on external sender or receiver (which could be users) is described below.

Output Message Send (X1). A component (i.e., usually a client machine) sends (displays) an output message to the external user, and then logs that the message has been sent. The sender component dies before the log is stable. The restarted client does not know whether the user has seen the message or not. Hence it must re-send the message. Because the user is not "eliminating duplicates", she sees a duplicate message.

Input Message Receive (X2). An external user sends a message, via keyboard, mouse, or other input device, to a (client) component. The receiving component fails before logging the existence and content of the message. On restart, the user has to resend the message. But the user, being an external component, has not promised to resend the message automatically until she knows the other component has received it. Rather, the user makes only a "best effort" at this, and moreover, the problem is not masked.

In the absence of a failure during the interaction, the result of an external interaction is an immediately committed interaction that masks internal failures from the external components.

Transactional Interaction Components

Another form of contract is directed to interactions with a transactional component (also referred to as a Tcom), such as a data server. These are request/reply interactions, where either a) a request message initiates the execution of a transaction (e.g., invoking a stored procedure) against the server's state and produces a reply reporting the transaction outcome or b) a sequence of request/reply interactions (e.g., SQL commands) occurs, the first initiating a transaction and the last being the server's final reply to a commit-transaction or rollback-transaction request. The Tcom's state transition is all-or-nothing, but the interaction is not guaranteed to complete. Conventionally, the Tcom final reply might not be delivered even though the transaction commits. A stronger guarantee is desired and provided in accordance with the present invention. Furthermore, conventionally, when the transaction aborts, the Tcom may forget the transaction, which can pose extra difficulties for the failure handling of the requester Pcom. This frequently encountered and widely accepted behavior is accounted for in accordance with the present invention by a transactional interaction contract (TIC) between a Pcom, the requestor, and a Tcom, the server that processes the transaction.

More particularly, a TIC between a Pcom and a Tcom comprises the following. The Tcom promises: (1) Atomic state transition (T1) in which the Tcom eventually proceeds to one of two possible states, either committing or aborting the transaction (or not executing it at all, equivalent to aborting). This state transition is persistent. (2) Faithful reply message (T2) in which the Tcom's reply message to the Pcom's commit-transaction or rollback-transaction request faithfully reports the Tcom's state transition, commit or abort. If a transaction aborts following a sequence of request/reply interactions within the transaction, abort is signaled to the Pcom in reply, perhaps, to the next request (e.g., through a return error code). (3) Persistent commit reply message (T3) in which, once the transaction commits, the Tcom replies acknowledging the commit request, and guarantees persistence of this reply.

The Pcom promises persistent state and commit request message (P1). The Pcom's commit request message must persist, as must the Pcom's state as of the time in which the transaction reply is expected, or later. The persistent state guarantee thus includes all earlier Tcom replies within the same transaction (e.g., SQL results, return codes). Persistence of the expected reply state means that the Tcom, rather than repeatedly sending its reply (under T3), need send it only once, perhaps not at all when a transaction aborts. The Pcom asks for the reply message should it not receive it. Guarantee P1 is conditional, and applies only for commits, not for aborts. P1 also removes the need for a Tcom to persist earlier messages in the transaction. Guarantee T3, in conjunction with P1, means that the Tcom need only capture the transaction's effects on its database and final commit reply, since earlier messages in the transaction are not needed for Pcom state persistence. Thus, the Tcom supports testable transaction status so that the Pcom can inquire whether a given transaction that has a persistent commit request was indeed committed. If the Tcom does not want to provide this testability over an extended time period, guarantee T3 can be implemented analogously to an ICIC with more eager measures by the receiving Pcom.

When a transaction aborts, there are no guarantees except that the transaction's effect on Tcom state is erased. If the Tcom aborts the transaction or the Pcom requests a transaction rollback, neither messages nor the Pcom's intra-transaction state need persist.

There are two cases:
1. When the Tcom fails or autonomously aborts the transaction for other reasons, the Pcom may re-initiate the transaction, but the Tcom will treat this as a completely new transaction.
2. When the Pcom fails in the middle of the transaction, the Tcom will abort (e.g., driven by timeouts for the connection) and forget the transaction. Should the Pcom later attempt to resume the transaction, the Tcom will respond with, e.g., a "transaction/connection unknown" return code, and the Pcom proceeds as in the first case.

System-Wide Composition of Recovery Contracts

Contracts result in the ability to make persistent the states of components with the result being as if the components had executed exactly once, without encountering a failure.

In a client-server setting with a human user as an external component, the external component is incapable of giving any recovery guarantees. Therefore, the contract between client and user is an XIC and not all failures are necessarily masked.

Consider a client-server system, including an external user who interacts with the client via external interactions. All failures can be masked with the exception of failures during the external client/user interaction, with client forced logging only as part of the external interaction.

For the client's replay capability, it needs the user's input messages to recreate both its state and its requests to the server. By treating user input messages as immediately committed interactions with immediate force-logging by the client, the recreatability of these messages is guaranteed on the client side. Note, however, that this is an external interaction, as the sending human user takes no measures itself. The client can replay its execution, and by its contract with the data server it can also recreate all output messages to the human user. Thus, the only uncertainties arise when the client fails during the interaction, before it logs the user input message, or when it fails after sending an output message to the user and cannot tell, upon its restart, if the user has seen this output or not.

Both send and receive masking failures can occur only with the last input or output message prior to a failure and are possible with any conceivable recovery algorithm without special hardware support. For output messages, if the client is a device that has testable state, e.g., an ATM for cash dispensing in which a mechanical counter records when money is dispensed, then duplicate output can be suppressed and output messages are guaranteed to be delivered exactly once. Should the client be a device that captures in stable memory each character a user types as it is entered, then the message becomes self-logging and the input message is entered exactly once.

Aspects of the present invention provide a system-wide recoverability guarantee for an arbitrarily complex multi-tier system. Bilateral recovery contracts between pairs of components are combined into a system-wide agreement that provides the desired guarantees to external users. The behavior of a multi-tier system is based on three different kinds of interactions: all system-internal interactions between a pair of persistent components have a committed interaction contract (either CIC or ICIC), all interactions between a persistent and a transactional component have a transactional interaction contract (TIC), and all external interactions that involve input from or output to a user (or external component) have an external interaction contract (XIC).

The form of recovery constitution is not limited to request-reply types of interactions. Arbitrary interaction patterns are allowed, including, for example, callbacks from a server to a client or among servers (e.g., to signal exceptions), or conversational message exchanges with either one of two components being a possible initiator (e.g., in collaborative work applications).

Implementing Recovery Contracts

As an example in accordance with the present invention, consider a three-tier architecture with a client and two tiers of application servers, e.g., a workflow server with whom the client interacts directly and an activity server that receives requests from the workflow server (on behalf of a client's request). Assume that the client and also both the workflow server and the activity server are piecewise deterministic.

The bilateral interaction contracts ensure exactly-once semantics for all user-initiated computations. Note, however, that the various contracts may be implemented in different ways. By treating user input as an external interaction with immediate forced logging, the client can recreate all its requests and its own state to the workflow server (except for a failure during the user interaction). So the CIC's for client requests between the client and the workflow server do not need any forced logging at the client. When multiple clients can communicate with the workflow server, the workflow server needs to log client request order, and make sure it is stable before sending requests to the activity server. The workflow server can enforce its CICs for both the requests to the activity server and the replies to the client without explicit measures by itself (aside from stable logging of client request order). The requests can be recreated by deterministic replay, with client requests re-obtained from the client, and for recreating replies to the client the workflow server can rely on the activity server to re-obtain the activity server's replies. Finally, the activity server needs to do forced logging for its CIC when sending replies to the workflow server.

Interaction contracts and implementation measures are separate layers in accordance with aspects of the present invention. It is possible to set up strong contracts for all bilateral interactions while implementing some of them with little or no overhead. Indeed, there are potentially many ways to manage a collection of components such that each component can support committed interactions. What is described illustrates one such approach.

Each component maintains its own log. The issues for normal operation are what to log, when to force the log, and how to minimize the overall overhead of logging.

Data servers have hard logging requirements because they are usually heavily utilized, support many concurrent "users", maintain valuable enterprise data, and are carefully managed for high availability. When an application interacts with a data server, the data server constructs a session at the server. When there is inter-transaction state (including perhaps control state), this session is regarded as a persistent component maintained by the data server. A session component is subject to the usual events, deterministic and non-deterministic, related to the sending and receiving of messages. Further, each session component accesses data via a data component (a Tcom) that manages the data. A session component indirectly interacts with other session components via a potentially non-deterministic sequence of data accesses mediated by the data component. If there is no session state, but only accesses to data, only the data component need exist.

The persistence requirements are partitioned into four elements: data component state, session component state, received messages, and sent messages.

Regarding data component state, data servers log entries for updates of persistent (database) data in physiological, physical or logical form. The data component for a database system is typically a Tcom. Tcom interactions with session or client components accessing the data are exposed at transaction boundaries. Thus, in addition to the usual logging for persistent data, the data component also logs only the final reply message for a caller's commit-transaction request (not prior intra-transaction replies), and the server log is forced before sending this final reply. For aborted transactions, no log forcing is necessary.

Regarding session component state, persistent state is maintained for the session components, when that state persists across transactions. SQL session state such as cursors or temporary tables can span transaction boundaries. The server maintains this information as state that is covered by interaction contracts.

A program executing in a session, e.g., stored procedure, need not persist if it lives entirely within a transaction. When it lives across transactions, e.g., a multi-transaction stored procedure, it is made persistent via replay, which is accomplished as with other persistent components, via interaction contracts. During restart after a server failure, incomplete requests (interactions with the data component) are replayed without altering previously committed data changes. This can be done by message logging, though optimizations exploiting the fact that all data server components share the same log manager are also possible.

Regarding session received messages, asynchronous message receives require logging, with logical logging being sufficient for CIC interactions. Logical log entries capture the non-deterministic interleaving and uniquely identify sender and message, but do not contain message contents. Other types of "received" events need to be logged, too, the log entries depending on the type of event (e.g., reading the system clock (an Xcom) requires logging the time read).

Regarding session sent messages, data servers need to recreate sent messages. Logging for this can be either physical, including message contents, or logical. Messages can be treated like any other effect of request execution. CIC's require, however, that the server force its log to include the (chronologically ordered) log records that ensure the persistence of a sent message before actually sending the message.

An advantage of CIC's versus ICIC's in reducing recovery overhead shows up with application servers and clients. For these components, often (but not necessarily) the only non-determinism is the result of user input or data server interactions. Further, these components usually have little reason for using ICIC's. What such components need to do for a CIC is to guarantee that replay will recreate their state and sent messages. In the absence of non-determinism, this is frequently possible without forcing the log at interactions between system components. Only user interactions need to be force-logged as external interactions.

For interactions with data servers (i.e., Tcom's), Pcom's (application servers or clients) ensure their state persistence as of the time of the commit-transaction request. If the transaction consists of a sequence of request/reply interactions, the Pcom creates log entries for the replies and its commit-transaction request and forces the log before sending the commit request. Otherwise (i.e., for transactions with a single invocation request, e.g., to execute a stored procedure, and single reply) no forced logging is performed, unless the commit request is preceded by non-deterministic events that have to be tracked. If the Pcom issues a rollback request, no force logging is needed.

Logging or installation points are used because components eventually release each other and data servers from the committed interaction requirement to resend messages upon request. But this is not forced logging, and a single application state installation or log write can serve to release contracts involving many committed interactions.

Component Restart After a Failure

After a failure, each persistent component carries out a local recovery procedure that re-incarnates the component as of the most recent, completed installation point and replays the component from there. For the replay, the local log is scanned in chronological order, with log entries appropriately interpreted to recreate persistent data and the component state. For the latter, the replayed component is intercepted upon message receives, data reads, and other non-deterministic events, and the appropriate information that has been reconstructed is fed into the component. This information can be drawn from the local log, or requested from other components. This procedure is desirably followed by all persistent components: data servers, application servers, and clients.

Once a persistent component is recovered, it resumes normal operation. Part of this is to periodically resend committed interaction messages because the receiver has not yet made its state stable. For a stable interaction, the message is resent when the receiver explicitly asks for it, so it needs to continue to be available. For an installed interaction (an ICIC is promptly installed), no action is needed, as the message contents are stable at the receiver. Log information for such a message can be garbage-collected.

Components may receive messages from other components that are resends of messages received before a failure. Cases include: (1) The component finds a log entry for the message from its prior incarnation. It prompts the sender component to deliver the message again if waiting for a spontaneous resend takes too long. (2) The component does not find a log entry for the message from its prior incarnation. The component restarts as if that message was never received. When it is eventually resent, it is treated as a new message. This is acceptable because the component has not committed its state (with the message receive) to any other component (otherwise a log force would have recorded the message receive on the log)

Recovery Independence

With complex multi-tier systems that span organizations and may thus include components that are operated in a largely autonomous manner, it is preferable that such components perform recovery independently of other potentially less reliable or untrusted components. These considerations lead to two notions of independent recovery.

It is desirable to avoid recovery of another component when this component has not failed. Therefore, it is preferable that component recovery is "isolated", i.e., does not lead to cascading restarts. Cascading restarts are typical of many proposed "optimistic" fault-tolerance algorithms. Components interoperating to provide cross-organizational e-services are largely autonomous, and such cascading behavior is undesirable and frequently infeasible.

Nonetheless, an isolated component is desirably able to resend messages as long as its contracts are not released. A solution is a volatile message lookup table that records in memory all uninstalled sent messages. These messages can then be resent without the overhead of component replay or the reading (involving random I/O) of the log. The message lookup table is reconstructed during recovery if the component should itself fail; so it can be present during normal server execution. Should the message lookup table be subject to memory pressure, it can be reduced in size by replacing some (of the oldest or longest, for example) messages by their positions in the log. This is safe as the corresponding log entries can still be obtained from the stable log, albeit at higher cost.

Another type of recovery is referred to as autonomous recovery. A (server) component wants to avoid having to communicate with, and thus depend on other components, during its own recovery after a failure. This notion of autonomous recovery can be generalized to component ensembles. Often, an ensemble of components tightly interoperates with mutually trusted components, but wants to stay autonomous with regard to components outside of the ensemble. One example is an ensemble of data server and application server for an e-commerce provider, with all clients being outside the ensemble.

The key to autonomous recovery is to avoid having to request that messages be resent from outside components in order for the ensemble to successfully restart. The solution is to exploit immediately committed interactions (ICIC's) for all messages received by the autonomous ensemble from the rest of the system. Subsequently, the component can be replayed without having to ask the sender component to resend its message. In the case of request-reply interactions, the contract for the received request message is released upon sending the reply. When the replier is a server, and the request initiates a server thread that starts in an initial state and terminates with the reply, the server does not need to log the request at all, but need only force-log the reply before sending it. These considerations carry over to components ensembles.

For messages within the ensemble, no force-logging or state installation is required when there is no non-determinism in the interactions. Should a component of the ensemble fail, it depends on other components in the ensemble for resending messages, but not on external components. This approach optimizes the overly conservative approach of using only immediately committed interactions between all components, reducing log I/O cost. An embodiment of the present invention uses a log force only upon the next message sent to an outside component, whereas immediately committed interactions use two forced log I/Os for every interaction.

Garbage Collection

Garbage collection is used for server components, which discard information from the message lookup table (MLT) to reclaim memory and truncate the log to reclaim log space for fast restart and high availability. Contracts with other components can hamper garbage collection. Therefore, it is desirable that log and MLT entries kept on behalf of other components can be dropped within reasonable time. Each kind of log record has its own truncation point.

To recover component state, only log entries for messages and non-deterministic events that follow the most recent installation point are desired. To advance this truncation point, one performs another installation point for the component's state.

Log entries for data updates can be discarded which have LSNs (i.e., log sequence numbers) less than the minimum of the LSN of the oldest update that has not yet been written back from the cache to disk and the LSN of the oldest update of all active transactions. A technique for advancing this minimum LSN is to flush the oldest dirty data pages, i.e. those with the oldest updates, from the cache.

Log entries for MLT entries kept to honor contracts with other components (for possible recovery of these other components) can be discarded up to the oldest of log records for messages not yet (known to be) installed. It is desirable to release CIC's by asking other components to force their log or create an installation-point. Once these actions are taken and the component receives an acknowledgement (i.e., install notification), it can garbage-collect the information. If autonomous garbage collection is desired, then the component preferably uses ICIC's.

The log can be truncated up to the earliest of the truncation points. Often, this earliest log entry can be copied forward in the log, though desired interleaving with other log records is preferably preserved. However, "alive" messages are only used to recover the MLT. It is desirable to ensure that the original LSNs and message sequence numbers are kept in the log entries themselves.

Receivers usually release CIC's fairly continuously, periodically taking installation points and forcing the log. These events can be signaled lazily to senders. One technique is to piggyback on the next message to a sender a message sequence number of the oldest still "alive", uninstalled message from the sender. Other techniques can be based on predefined agreement, interaction patterns, or session boundaries. For example, end-of-session notification (e.g., via session time-out) might mean releasing the contracts for all session messages. Sometimes the next request from the same component could be an implicit form of such a release.

Exemplary Scenario

As an example scenario, consider a multi-tier travel e-service. Additional scenarios, such as an e-commerce ordering service and electronic auctions, can also be implemented in accordance with the present invention. For a multi-tier system in accordance with the present invention, system components are identified, along with their bilateral interactions and relevant non-deterministic events of the various components. Interaction contracts are set up between pairs of components, and then it is determined how to implement the contracts in terms of what to log and when to force the log.

Figure 7:
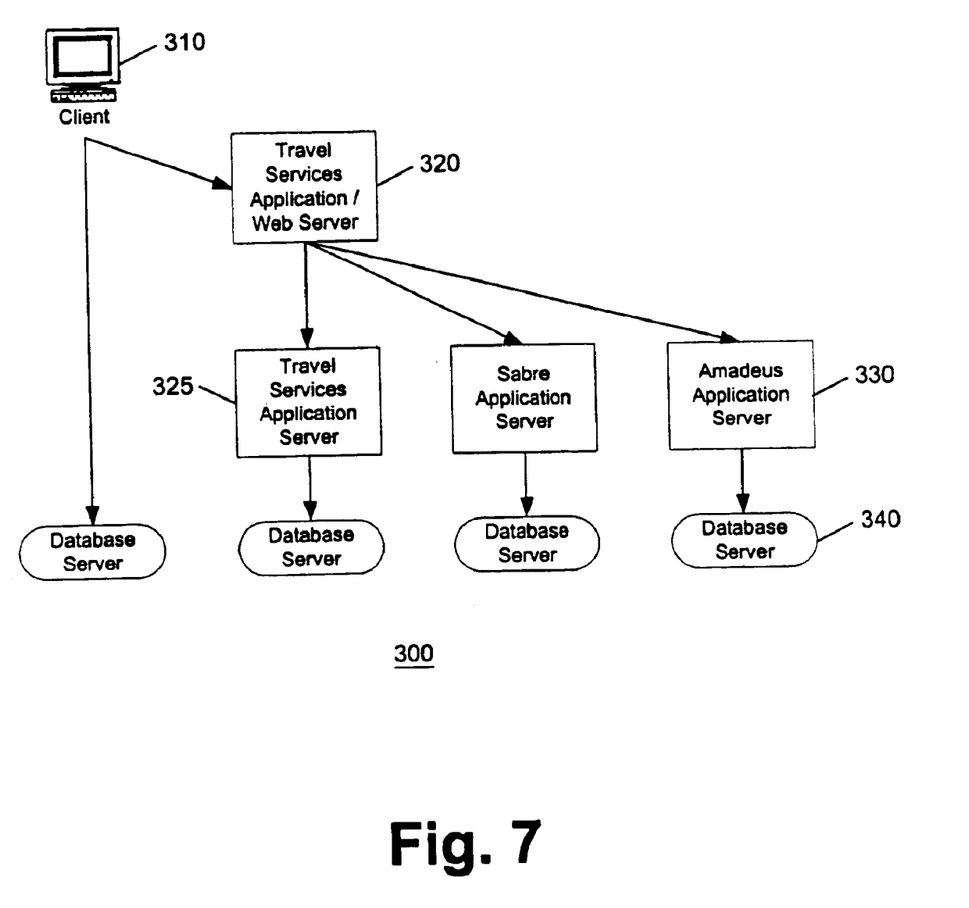
FIG. 7 is an exemplary system architecture useful for describing aspects of the present invention.

An exemplary system architecture is shown in FIG. 7, in which a four-tier system 300 comprises a client 310 using Internet browsers, two tiers of application servers 320–330 in the middle, and a suite of backend data servers 340. A client 310 sends a travel request to the upper-tier travel services application server 320. The client, whose state is extended via cookies or applets for personalization (e.g., seating preferences, frequent flyer numbers, etc.), forwards such information to the travel services web server (also shown as 320), which may directly access data servers 340 to persist this information. The web server 320 runs workflow-style servlets on behalf of client requests. This level hosts business logic and is in charge of building and maintaining tentative itineraries for users' travel plans. To this end, it keeps user state that spans conversational interactions with the client for the duration of a user session, typically using session objects whose job is to hold shared data on the web server. For querying flight fares, hotel rates and availability, etc., the web server 320 interacts with lower-tier application servers 330. These include servers operated by autonomous travel companies with their own backend data servers, e.g., Amadeus and Sabre. One of the lower-tier application servers 325 is a server (which may be part of the travel services system) running servlets that communicate with a database 340 for long-term information about customers. The client may also interact with a data server to store user information such as credit card numbers.

Client and travel service components (client sessions with both web server and application server) are regarded as persistent components as are the Amadeus and Sabre application servers, and data servers are preferably transactional components. Non-determinism resulting from Amadeus or Sabre interactions is captured via ICIC forced logging. However, messages leading up to a purchase that are directed to the travel service application server are treated as CIC's, and do not require forced logging. Queries to the travel service data server are treated as TIC's. The bilateral interaction contracts are set up as follows:

[user ⇔ client] The client handles user input and output with XIC's, and promptly forces logging to enforce the guarantee. Current internet browsers do not provide native support for logging, but could be enhanced through a plug-in or an applet.

[client ⇔ data server] Interactions between the client and the data server are handled with TIC's. The data server commits modifications to the permanent and shared database when sending its final reply to the client, and forces a log of this final reply message.

[client ⇔ travel service web server] Between client and upper tier web server, client request and server reply are handled with CIC's. No forced logging is required as client XIC. logging captures all non-determinism.

[travel service web server ⇔ travel service application server] Between the travel service web server and application server, requests and replies are handled with CIC's. No forced logging is required as client XIC logging captures all non-determinism.

[travel service web server ⇔ external application server] Between the upper tier application web server and lower tier external application servers, ICIC's that use forced logging by both the travel service web server and external application servers are used to capture the potential non-determinism as these application servers belong to other organizations and are thus autonomous.

[application server→data server] Requests from application server to data server are transactional, and use a TIC. Because the application server is without non-determinism, forced logging of individual requests is not required. A commit request exposes the effects of application server execution via changes to data server state, and hence this state persists. However, since prior ICIC's with the travel service server or client have captured all non-determinism already, forced logging is not required.

[data server→application server] A data server commits modifications to a shared database when sending its final reply to the application server, exposing changes to other application servers. Thus, the TIC uses a persistent reply message. Hence, this final reply (i.e., the return value for the SQL "commit work") is forced logged, which also captures the committed data server state changes.

The contracts identified above are desirable for system-wide recoverability. The data server may also use effective garbage collection and independent recovery. Specifically, the data server can treat its transaction ending reply to the application server as an immediately committed interaction so that it can discard messages once it knows that the application server has received them, and hence truncate its log at its discretion.

The number of forced log writes dominates the cost of the protocols in the above scenario. Let the user session consist of u input messages and u output messages, and let the client generate one request to its local data server and x requests to the travel service server for each user's input message. In turn, the travel service will create y requests per incoming request to each of the three application servers, and let each of the external application servers create z requests per incoming request to its local data server. Under these assumptions, standard techniques based on pessimistic message logging require a total of 2u+4u+4ux+12uxy+12uxyz forced log writes. In contrast, a protocol in accordance with the present invention, using XIC's between user and client, TIC's between client and its local data server, CIC's between client and the travel service, ICIC's between the travel service and external application servers, and TIC's between external application servers and their local data servers, would require u+u+0+12uxy+3uxyz forced log writes, a saving of 4u+4ux+9uxyz disk I/Os.

The various techniques described herein may be implemented with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. One or more programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

The methods and apparatus of the present invention may also be embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, a video recorder or the like, the machine becomes an apparatus for practicing the invention. When implemented on a general-purpose processor, the program code combines with the processor to provide a unique apparatus that operates to perform the versioning functionality of the present invention.

It is noted that the foregoing examples have been provided merely for the purpose of explanation and are in no way to be construed as limiting of the present invention. While the invention has been described with reference to various embodiments, it is understood that the words which have been used herein are words of description and illustration, rather than words of limitations. Further, although the invention has been described herein with reference to particular means, materials and embodiments, the invention is not intended to be limited to the particulars disclosed herein; rather, the invention extends to all functionally equivalent structures, methods and uses, such as are within the scope of the appended claims.

What is claimed is:

1. A method of providing recovery of components having non-deterministic events in a computer system, comprising:

detecting a failure;

determining a plurality of components that were active prior to the failure;

determining which of the components were deactivated prior to the failure:

re-incarnating each of the plurality of active components;

discarding the deactivated components prior to re-incarnating the active components;

replaying the non-deterministic events associated with the active components; and re-executing each of the active components.

2. A computer readable medium having computer-executable instructions for performing the steps comprising:

receiving a recovery contract between the first component and the second component;

implementing the recovery contract, wherein the first and second components have a mutual agreement on when the contract will be released;

re-incarnating the first component from a first installation point; and re-incarnating the second component from a second installation point.

3. A computer readable medium having computer-executable instructions for performing the steps comprising:

detecting a failure in a computer system;

determining a plurality of components that were active prior to the failure;

determining which of the components were deactivated prior to the failure;

re-incarnating each of the plurality of active components;

discarding the deactivated components prior to re-incarnating the active components;

replaying the non-deterministic events associated with the active components; and re-executing each of the active components.

* * * * *